US009444288B2

(12) United States Patent
Sato et al.

(10) Patent No.: US 9,444,288 B2
(45) Date of Patent: Sep. 13, 2016

(54) POWER MONITOR AND CONTROL APPARATUS AND CONTROL APPARATUS OF DISTRIBUTED POWERING SYSTEM

(75) Inventors: Yasuo Sato, Hitachinaka (JP);
Takafumi Ebara, Yokohama (JP);
Masahiro Watanabe, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 937 days.

(21) Appl. No.: 13/617,594

(22) Filed: Sep. 14, 2012

(65) Prior Publication Data
US 2013/0069447 A1 Mar. 21, 2013

(30) Foreign Application Priority Data

Sep. 20, 2011 (JP) .................................. 2011-205144

(51) Int. Cl.
*H02J 13/00* (2006.01)
*H02J 3/00* (2006.01)

(52) U.S. Cl.
CPC .............. *H02J 13/0006* (2013.01); *H02J 3/00* (2013.01); *H02J 2003/001* (2013.01); *Y10T 307/832* (2015.04)

(58) Field of Classification Search
CPC ............................. H02J 3/14; Y02B 70/3225
USPC ......................................................... 307/38
See application file for complete search history.

(56) References Cited

U.S. PATENT DOCUMENTS

| 7,886,173 B2* | 2/2011 | Krieger | H02J 9/061 713/330 |
| 2003/0105567 A1* | 6/2003 | Koenig | H01M 10/48 701/36 |
| 2006/0072262 A1* | 4/2006 | Paik | H02J 3/14 361/62 |
| 2007/0018506 A1* | 1/2007 | Paik | H02J 9/06 307/115 |
| 2008/0278000 A1* | 11/2008 | Capp | H02J 3/04 307/21 |
| 2011/0133715 A1* | 6/2011 | Zushi | G01R 31/024 323/285 |

FOREIGN PATENT DOCUMENTS

| JP | 2005-033851 A | 2/2005 |
| JP | 2007-037354 A | 2/2007 |

* cited by examiner

*Primary Examiner* — Thienvu Tran
*Assistant Examiner* — David M Stables
(74) *Attorney, Agent, or Firm* — Mattingly & Malur, PC

(57) ABSTRACT

If a failure has occurred on the backbone-power-transmission-network side, i.e., the electric-power system, and if the power supply to a power-distributing/transforming substation is stopped, a power-distributing feeder is cut off from the electric-power system. Moreover, a monitor/control apparatus transmits a single-operation-permitting permission signal to a distributed power-source system which is connected to the cut-off power-distributing feeder. Here, the distributed power-source system supplies its power to the power-distributing feeder only during a time-interval in which the system is receiving the permission signal. A general load and an important load, which are connected to the power-distributing feeder, find it possible to continue their activities by taking advantage of this power.

4 Claims, 11 Drawing Sheets

FIG. 5

| FEEDER ID | IMPORTANT-LOAD ID | ADVISABILITY/ INADVISABILITY |
|---|---|---|
| 1001 | — | ☐ |
| 1002 | G01, G02 | ☐ |
| 1003 | H03 | ☐ |
| ... | ... | ... |

ADVISABILITY/INADVISABILITY SETTING FOR INDEPENDENT OPERATION

CANCELLATION  REGISTRATION

POWER MONITOR AND CONTROL APPARATUS AND CONTROL APPARATUS OF DISTRIBUTED POWERING SYSTEM

BACKGROUND OF THE INVENTION

The present invention relates to a power monitor/control apparatus, and the control apparatus for controlling a distributed power-source system.

Electric channels and facilities are used for supplying a commercial power-source to each customer (such as individual house, building, or factory) from an electric-power supplier such as electric-power company. These electric channels and facilities are referred to as, as a whole, "an electric-power system". Excluding some specific large-scale customers, each customer has usually used only the commercial power-source supplied from the electric-power system.

In recent years, however, there has been a significant desire for the prevalence of energy sources which impose a less load on natural environments. Examples of this kind of less-load energy sources are photovoltaic power generation, wind power generation, heat pump, and fuel cell. Since these energy sources are provided on each customer basis, they are referred to as "distributed power-sources". This designation is given in contrast to the conventional large-scale power-generating stations which are provided in a concentrated manner at locations apart from urban cities.

When a malfunction occurs in the electric-power system, it becomes necessary to simultaneously stop all of the distributed power-sources which are connected to the electric-power system. This simultaneous stopping becomes necessary for ensuring the safety of workers concerned. Accordingly, an apparatus for preventing the single operation of each distributed power-source is set up in advance into each distributed power-source (JP-A-2007-37354, JP-A-2005-33851).

SUMMARY OF THE INVENTION

In accompaniment with the occurrence of a failure of the electric-power system, a system section is caused to occur by being separated from the electric-power system. In recent years, however, the distributed power-sources have prevailed. Accordingly, it is conceivable that the power-generation amount and the power-consumption amount within the system section are not balanced in some cases. In view of this situation, the proposals have been made concerning a technology (JP-A-2007-37354) for normally operating the single-operation prevention apparatus set up into each distributed power-source, and a technology (JP-A-2005-33851) for warning that a distributed power-source is operating in the single-operation manner.

In this way, the precondition in the conventional technologies is as follows: Namely, the single operation of each distributed power-source is prevented at the time of a failure of the electric-power system. Consequently, when a large-scale natural disaster happens, it is impossible to effectively utilize the distributed power-sources which are distributed within the power-failure occurrence area.

Accordingly, an object of the present invention is to provide a power monitor/control apparatus, and the control apparatus for controlling a distributed power-source system which make it possible to effectively utilize the distributed power-source system. Another object of the present invention is to provide the power monitor/control apparatus, and the control apparatus for controlling the distributed power-source system which, when a failure occurs in the electric-power system, make it possible to effectively utilize the distributed power-source system while ensuring the safety.

In order to accomplish the above-described objects, the power monitor/control apparatus according to the present invention is configured as follows: A power monitor/control apparatus for monitoring and controlling an electric-power system, including an independent-operation judgment unit for judging whether or not a permission signal should be transmitted to a distributed power-source system, the permission signal being used for permitting power supply to a predetermined system section, the power supply being performed by the distributed power-source system included within the predetermined system section, the predetermined system section being separated from the electric-power system by operating a predetermined switch, and a permission-signal transmission unit for transmitting the permission signal to the distributed power-source system, wherein the independent-operation judgment unit causes the permission signal to be transmitted from the permission-signal transmission unit to the distributed power-source system, if the independent-operation judgment unit detects a stop of the power supply to the predetermined system section from the electric-power system.

The permission signal may also play a role of an operation signal for generating the predetermined system section by operating the predetermined switch.

The power monitor/control apparatus can further include a setting unit for setting advisability/inadvisability-determining information into the independent-operation judgment unit, the advisability/inadvisability-determining information being used for determining advisability/inadvisability of the transmission of the permission signal.

At least a partial content of the configuration of the present invention can be implemented as a computer program. The computer program can be delivered via a communications medium such as, e.g., the Internet, and a recording medium such as, e.g., a hard disc or a flash-memory device.

BRIEF DESCRIPTION OF THE DRAWINGS

FIG. 5 illustrates a screen example for setting in advance the advisability/inadvisability of the single operation (i.e., independent operation) of the distributed power-source system;

DETAILED DESCRIPTION OF THE EMBODIMENT

Hereinafter, based on the drawings, the explanation will be given below concerning an embodiment of the present invention. In the present embodiment, as will be described in detail hereinafter, a power monitor/control apparatus 1 transmits a permission signal to a distributed power-source system 3, the permission signal being used for permitting the single operation of the distributed power-source system 3 with respect to a predetermined system section separated from an electric-power system. Which distributed power-source system's single operation should be permitted can be set in advance by the manager, or can be commanded by using remote control.

When a trouble occurs in the electric-power system due to a cause such as earthquake, this configuration in the present embodiment makes it possible to supply power to the system section by permitting the distributed power-source system provided in the system section to perform the independent operation. Accordingly, at the time of the failure of the electric-power system, it becomes possible to supply the power to electric loads (i.e., customers) existing along the system section. This feature allows implementation of an enhancement in the convenience.

Embodiment 1

Figure 1:
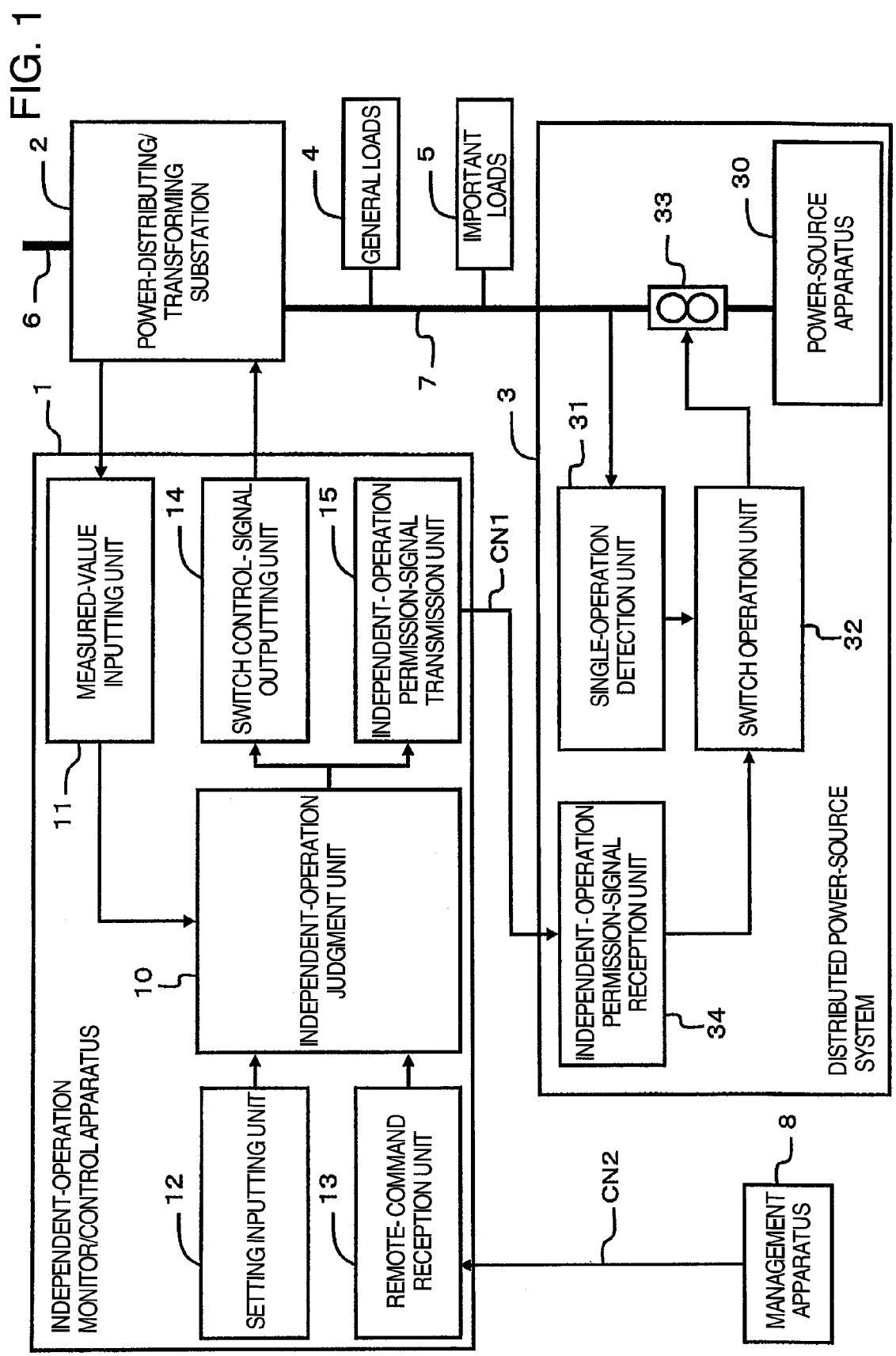
FIG. 1 illustrates the functional configuration of a power-distributing system including a power monitor/control apparatus and a distributed power-source system.

FIG. 1 is an entire configuration diagram of a power-distributing system including the independent-operation monitor/control apparatus 1 as "the power monitor/control apparatus". The power-distributing system can include the independent-operation monitor/control apparatus 1 (which, hereinafter, will be abbreviated as "the monitor/control apparatus 1"), a power-distributing/transforming substation 2, the distributed power-source system 3, general loads 4, and important loads 5. Incidentally, the configuration of the power-distributing system differs for each country. The configuration illustrated in FIG. 1 is merely its one example. Namely, the present invention is also applicable to a power-distributing system whose configuration is other than the configuration illustrated in FIG. 1.

The power-distributing/transforming substation 2 lowers the voltage value of power which is supplied from a power-transmitting station via a backbone power-transmission network 6. In this way, the substation 2 supplies a predetermined-voltage power to each load 4 and load 5. The power-distributing/transforming substation 2 supplies the power to each load 4 and load 5 via a plurality of power-distributing feeders (i.e., power-supplying lines) 7.

Here, the customers can be basically classified into, e.g., the general customers (i.e., general loads) 4, and the important customers (i.e., important loads) 5. In the drawing, the customers are expressed as being the electric loads. In the following explanation, the general customers will be referred to as the general loads, and the important customers will be referred to as the important loads. The loads which can be mentioned as the general loads 4 are the ones of places such as, e.g., ordinary individual house, office building, and commercial facilities. The loads which can be mentioned as the important loads 5 are the ones of places to which the power supply should be maintained at the time of the occurrence of a disaster, such as, e.g., hospital, public office, police station, and fire station.

The monitor/control apparatus 1 is constituted as a computer system. For example, a microprocessor executes a predetermined computer program, thereby implementing a predetermined function. The monitor/control apparatus 1 is connected to the distributed power-source system 3 via a first communications network CN1. Moreover, the monitor/control apparatus 1 is connected to a management apparatus 8 via a second communications network CN2. The first communications network CN1 and the second communications network CN2 may be configured as a communications network which is common thereto, or may be configured as communications networks which are different from each other.

The monitor/control apparatus 1 includes, as its functions, e.g., an independent-operation judgment unit 10, a measured-value inputting unit 11, a setting inputting unit 12, a remote-command reception unit 13, an switch control-signal outputting unit 14, and an independent-operation permission-signal transmission unit 15.

The independent-operation judgment unit 10 judges whether or not the power-distributing feeders 7 as a predetermined system section separated from the electric-power system should be permitted to perform an independent operation. The independent operation means the single operation of the distributed power-source system 3 which is connected to the power-distributing feeders 7 cut off from the electric-power system. The independent operation is an operation state where the power supply from the distributed power-source system 3 to the power-distributing feeders 7 is permitted.

The measured-value inputting unit 11 monitors the state of the power which is being supplied to the power-distributing/transforming substation 2. Based on the power-supplied state detected by the measured-value inputting unit 11, the independent-operation judgment unit 10 monitors whether or not the power supply to the power-distributing/transforming substation 2 is lost.

If the power supply from the backbone power-transmission network 6 to the power-distributing/transforming substation 2 is stopped, the independent-operation judgment unit 10 judges whether or not to permit the single operation of the distributed power-source system 3. This judgment is made based on advisability/inadvisability-determining information which is inputted from either the setting inputting unit 12 or the remote-command reception unit 13.

The advisability/inadvisability-determining information is information which sets in advance whether or not to permit the single operation of the distributed power-source system 3 which is connected to the power-distributing feeders 7 separated from the electric-power system. The setting inputting unit 12 as "setting unit" is capable of creating and outputting a setting screen 120 as is illustrated in FIG. 5.

Referring to FIG. 5 before referring to the remaining drawings, the explanation will be given below concerning the configuration of the setting screen 120. The setting screen 120 includes, e.g., a power-distributing-feeder identifier field 121, an important-load identifier field 122, and an advisability/inadvisability flag field 123. The power-distributing-feeder identifier field 121 memorizes power-distributing-feeder identifiers for identifying the power-distributing feeders 7. Incidentally, in the drawing, "identifier" is represented as being "ID". The important-load identifier field 122 memorizes important-load identifiers for identifying the important loads 5 which are connected to the power-distributing feeders 7 specified by the power-distributing-feeder identifier field 121. The advisability/inadvisability flag field 123 memorizes control flags for indicating whether or not to permit the independent operation (i.e., single operation of the distributed power-source system 3) when the power-distributing feeders 7 specified by the power-distributing-feeder identifier field 121 are separated from the electric-power system.

Using the setting screen 120, the manager, who manages the monitor/control apparatus 1, sets the advisability/inadvisability of the independent operation for each power-distributing feeder 7. Moreover, the manager operates a registration button 124, thereby registering the contents set onto the setting screen 120.

The remote-command reception unit 13 as "setting unit" receives the advisability/inadvisability-determining information from the management apparatus 8 positioned outside. The management apparatus 8 can be configured as, e.g., a partial content of a power concentration monitor/control system. Otherwise, the management apparatus 8 may be configured as a personal computer or an information-processing terminal (including mobile telephone) possessed by the manager. In the present embodiment, both of the setting inputting unit 12 and the remote-command reception unit 13 are exemplified as the setting unit for setting the advisability/inadvisability-determining information. The configuration equipped with only either of them, however, is also allowable.

The switch control-signal outputting unit 14 outputs a control signal for controlling the operation of an switch 22 (refer to FIG. 3) which is provided between the electric-power system and the power-distributing feeders 7. The switch control-signal outputting unit 14 may also be expressed as, e.g., "an open/close operation unit for outputting a signal for operating an open/close unit for establishing the connection between the electric-power system and the predetermined system section".

If an open signal is transmitted from the switch control-signal outputting unit 14 to the switch 22, the switch 22 falls into an open state. Accordingly, the power-distributing feeders 7 connected to the switch 22 are separated from the electric-power system (i.e., backbone power-transmission network 6). In contrast thereto, if a close signal is transmitted from the switch control-signal outputting unit 14 to the switch 22, the switch 22 falls into a close state. Consequently, the power-distributing feeders 7 connected to the switch 22 are reconnected to the electric-power system.

The independent-operation permission-signal transmission unit 15 as "permission-signal transmission unit" transmits a permission signal for permitting the independent operation (i.e., single operation) to the distributed power-source system 3 whose independent operation is permitted, and which is connected to the power-distributing feeders 7. Hereinafter, this independent-operation permission signal will be abbreviated as "permission signal" in some cases.

As was exactly described above, if the power supply from the backbone power-transmission network 6 to the power-distributing/transforming substation 2 is stopped, the independent-operation judgment unit 10 judges whether or not the flag for permitting the independent operation is set for the power-distributing feeders 7 which is cut off from the electric-power system. Then, if the permission flag is set, the independent-operation judgment unit 10 causes the switch control-signal outputting unit 14 to output the open signal, thereby separating the power-distributing feeder 7 from the electric-power system. Subsequently, the independent-operation judgment unit 10 causes the independent-operation permission-signal transmission unit 15 to transmit the independent-operation-permitting permission signal to the distributed power-source system 3 which is connected to the separated power-distributing feeder 7.

Figure 2:
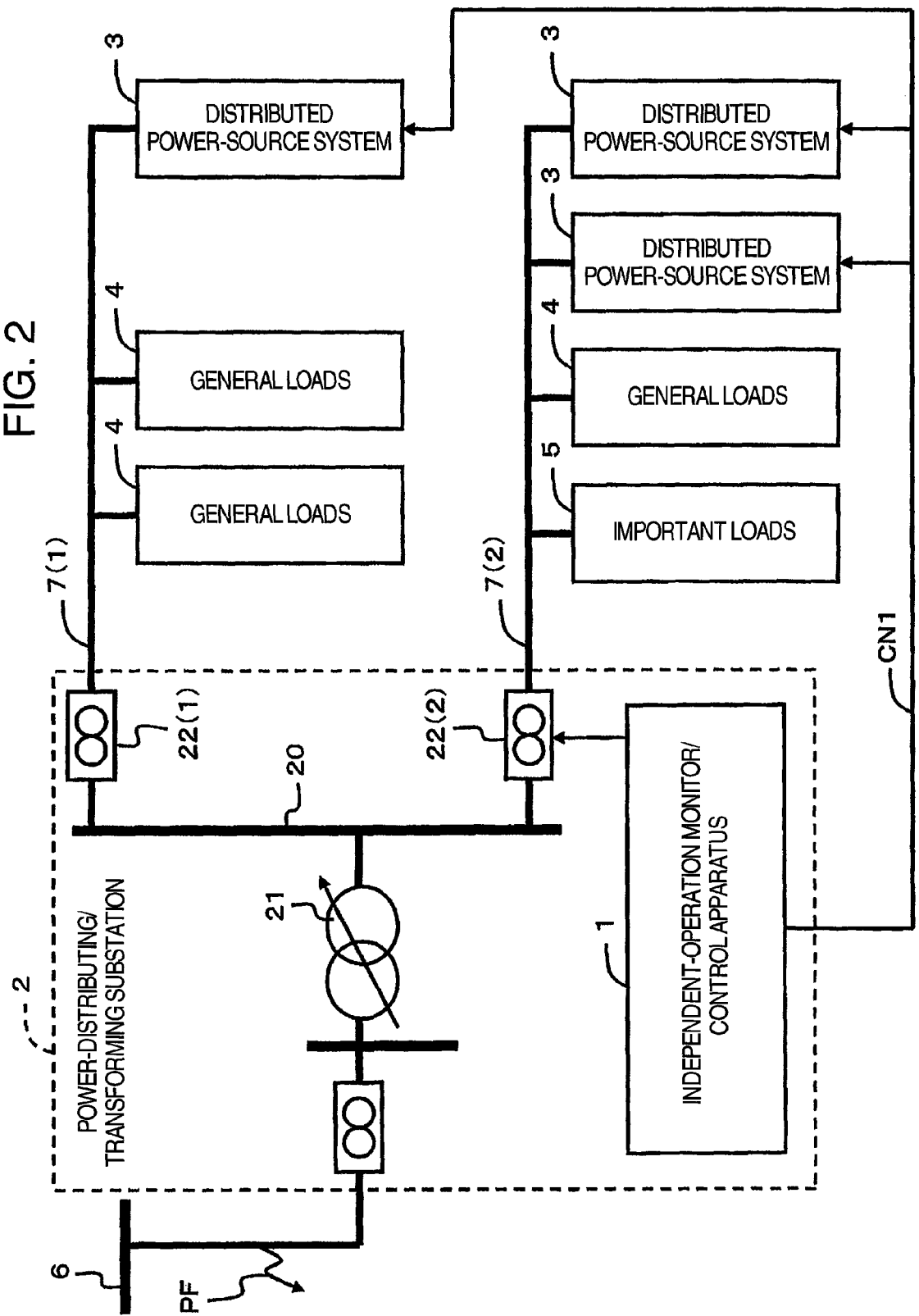
FIG. 2 illustrates a configuration example of the power-distributing system.

The configuration of the distributed power-source system 3 will be described later in FIG. 4. Instead, reference is made to FIG. 2 before referring to the remaining drawings. FIG. 2 illustrates the configuration of the power-distributing system schematically. In FIG. 2, the monitor/control apparatus 1 is set up inside the power-distributing/transforming substation 2. Incidentally, the configuration is also allowable where the monitor/control apparatus 1 is set up outside the power-distributing/transforming substation 2.

The power-distributing/transforming substation 2 uses an electric transformer 21, thereby transforming the voltage value of the power, which is supplied from the backbone power-transmission network 6, into a predetermined voltage value. Moreover, the substation 2 outputs this predetermined-voltage-value power to a bus line 20. A plurality of power-distributing feeders 7 (1) and 7 (2) are connected to the power-distributing bus line 20 via switches 22 (1) and 22 (2). The power is supplied from the power-distributing/transforming substation 2 to the one power-distributing feeder 7 (1) via the one switch 22 (1). Also, the power is supplied from the power-distributing/transforming substation 2 to the other power-distributing feeder 7 (2) via the other switch 22 (2).

A plurality of general loads 4 and a single distributed power-source system 3 are connected to the one power-distributing feeder 7 (1). In contrast thereto, a general load 4 and an important load 5, and a plurality of distributed power-source systems 3 are connected to the other power-distributing feeder 7 (2).

In the one power-distributing feeder 7 (1), there is provided the smallest number of distributed power-source system 3. Simultaneously, there is provided none of the important load 5, which necessitates the power supply at the time of the occurrence of a disaster. Accordingly, the manger is allowed to so set the flag as not to permit the independent operation with respect to the one power-distributing feeder 7 (1).

In contrast thereto, in the other power-distributing feeder 7 (2), there are provided the large number of distributed power-source systems 3. Simultaneously, there is provided the important load 5, to which the power should also be supplied at the time of the occurrence of a disaster. Consequently, the manger is allowed to so set the flag as to permit the independent operation with respect to the other power-distributing feeder 7 (2).

In this way, the manger can determine in advance a power-distributing feeder 7 whose independent operation should be permitted at the time of the occurrence of a disaster. This determination is performed based on, e.g., the type and the number of the important loads 5 included in each power-distributing feeder 7, and the number and the total power-generating capability of the distributed power-source systems 3 included therein.

Figure 3:
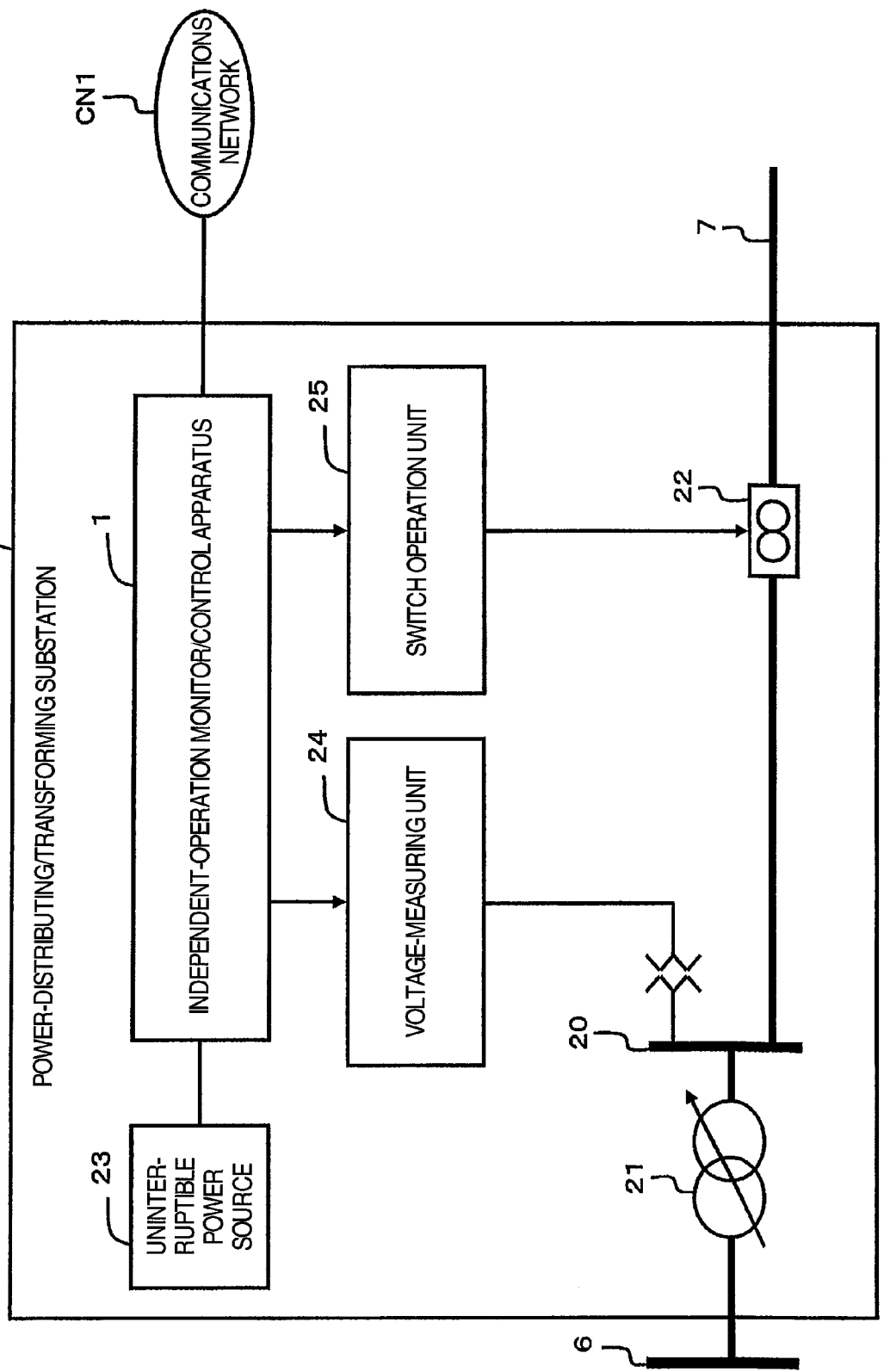
FIG. 3 illustrates the configuration of a power-distributing/transforming substation.

FIG. 3 illustrates the functional configuration of the power-distributing/transforming substation 2. As described above, the monitor/control apparatus 1 can be set up inside the power-distributing/transforming substation 2. The power-distributing/transforming substation 2 includes, e.g., the electric transformer 21 provided between the bus line 20 and the backbone power-transmission network 6, the switch 22 provided between the bus line 20 and the power-distributing feeders 7, a voltage-measuring unit 24 connected to the measured-value inputting unit 11, and an switch operation unit 25 connected to the switch control-signal outputting unit 14.

If the power supply from the backbone power-transmission network 6 to the power-distributing/transforming substation 2 is stopped, a uninterruptible power source 23 supplies power to the monitor/control apparatus 1. The voltage-measuring unit 24 measures the voltage value of the bus line 20. This measured voltage value is inputted into the measured-value inputting unit 11 from the voltage-measuring unit 24. In accordance with the control signal from the switch control-signal outputting unit 14, the switch operation unit 25 outputs the signals for implementing the open/close of the switch 22.

Figure 4:
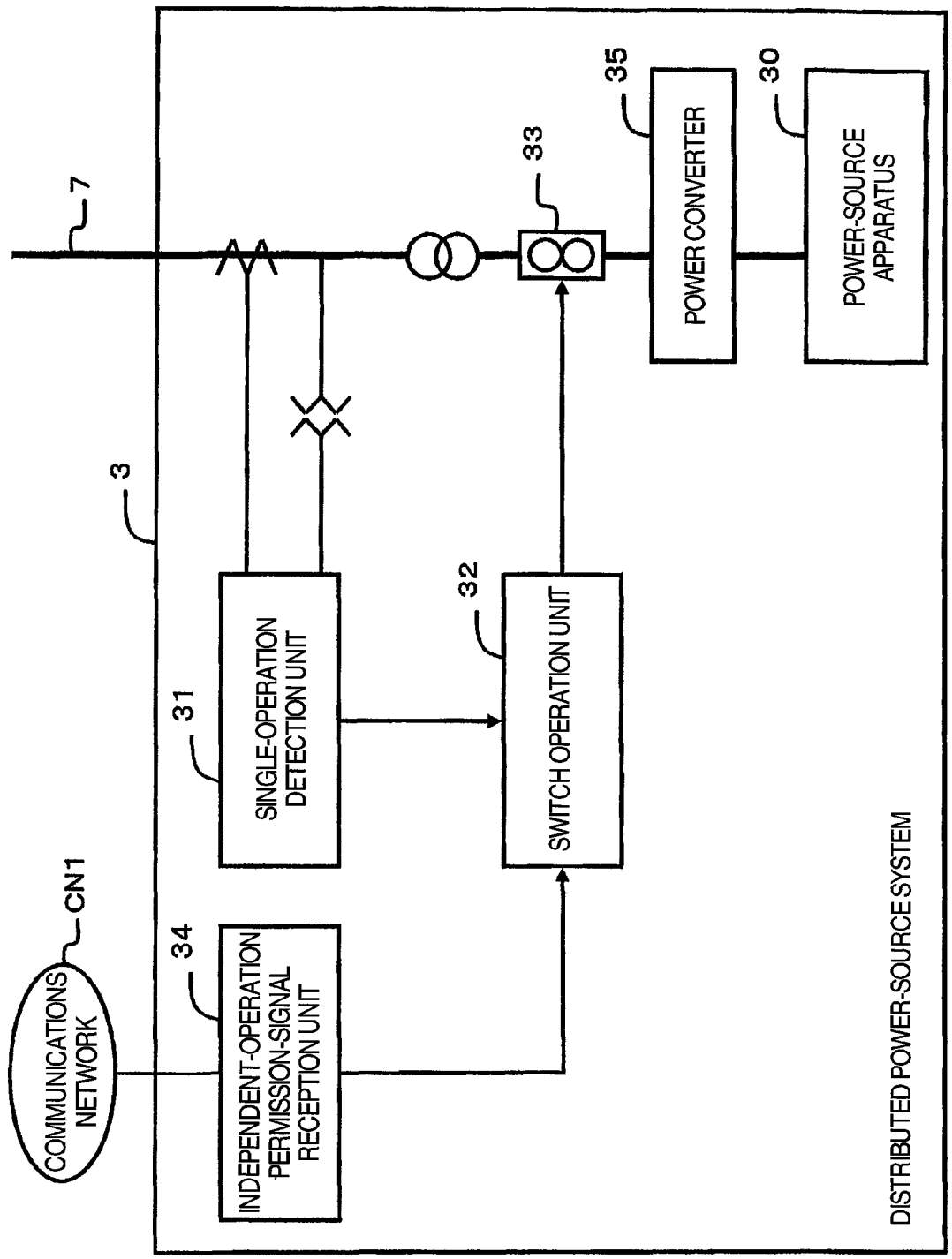
FIG. 4 illustrates the configuration of the distributed power-source system.

FIG. 4 illustrates the functional configuration of the distributed power-source system 3. The distributed power-source system 3 includes, e.g., a power-source apparatus 30, a single-operation detection unit 31, an switch operation unit 32, an switch 33, an independent-operation permission-signal reception unit 34, and a power converter 35. The single-operation detection unit 31, the switch operation unit 32, and the independent-operation permission-signal reception unit 34 can be configured as electronic circuits, respectively. The control apparatus for controlling the distributed power-source system 3 can be configured from, e.g., the single-operation detection unit 31, the switch operation unit 32, and the independent-operation permission-signal reception unit 34.

The power-source apparatus 30 is configured as, e.g., a photovoltaic power generator, solar thermal power generator, wind power generator, or fuel-cell cogenerator. The power generated by the power-source apparatus 30 is supplied to the power-distributing feeders 7 via the power converter 35. The power converter 35 is an electric circuit for implementing the AC-DC conversion, and adjusting the frequency and the voltage value.

The single-operation detection unit 31 is of a function for preventing the single-operation state. The single-operation detection unit 31 monitors the voltage value of the power-distributing feeders 7. Then, if the power supply from the power-distributing feeders 7 is lost, the single-operation detection unit 31 commands the switch operation unit 32 to output an open signal.

The switch operation unit 32 is of a function for operating the open/close of the switch 33 provided between the power-distributing feeders 7 and the power converter 35. When commanded to output the open signal from the single-operation detection unit 31, the switch operation unit 32 outputs the open signal to the switch 33, thereby electrically interrupting the connection between the power-distributing feeders 7 and the power converter 35. This interruption prevents the power, which is generated by the power-source apparatus 30, from flowing into the power-distributing feeders 7.

Meanwhile, the independent-operation permission-signal reception unit 34 receives the signal for permitting the independent operation (i.e., the independent-operation permission signal) from the independent-operation permission-signal transmission unit 15 of the monitor/control apparatus 1 via the first communications network CN1. Moreover, the independent-operation permission-signal reception unit 34 transmits the independent-operation permission signal to the switch operation unit 32, thereby preventing the switch operation unit 32 from outputting the open signal to the switch 33. Hereinafter, in some cases, the independent-operation permission-signal transmission unit 15 and the independent-operation permission-signal reception unit 34 will be abbreviated as "the permission-signal transmission unit 15" and "the permission-signal reception unit 34", respectively.

If the permission-signal reception unit 34 cannot receive the permission signal from the permission-signal transmission unit 15 of the monitor/control apparatus 1, the unit 34 does not transmit the permission signal to the switch operation unit 32. Because of this non-transmission of the permission signal, the open-signal outputting command becomes valid which is transmitted from the single-operation detection unit 31 to the switch operation unit 32. As a result, the switch operation unit 32 outputs the open signal to the switch 33, thereby electrically interrupting the connection between the power-distributing feeders 7 and the power converter 35. In the following explanation, the command of causing the switch operation unit 32 to output the open signal to the switch 33 will be referred to as "an interruption command" in some cases.

In this way, as long as the switch operation unit 32 is receiving the permission signal from the permission-signal reception unit 34, the switch operation unit 32 judges that the interruption command from the single-operation detection unit 31 is invalid. This judgment is made even if the unit 32 has already accepted the interruption command from the single-operation detection unit 31.

Figure 6:
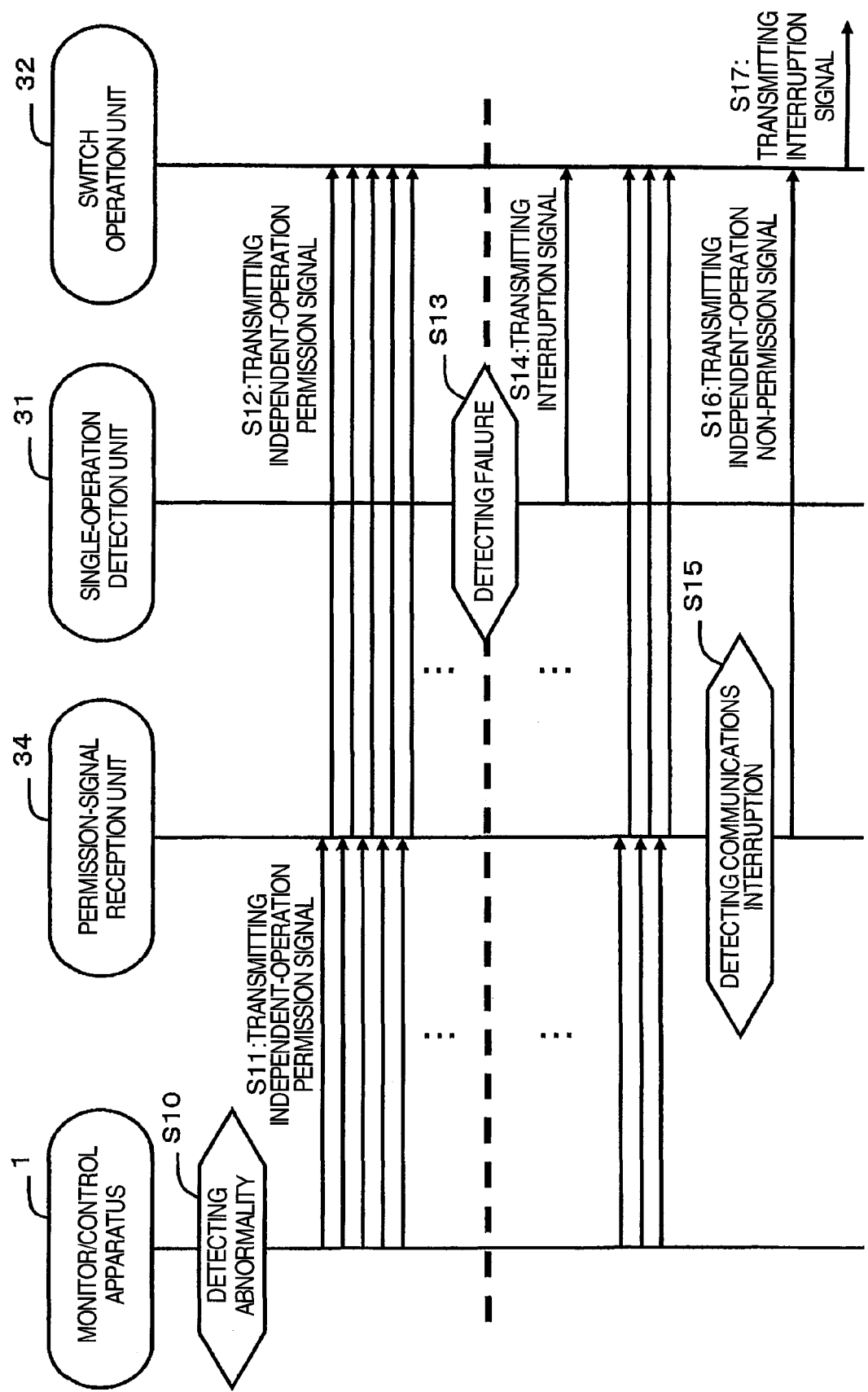
FIG. 6 is an explanatory diagram for illustrating a manner of how the communications processing is performed between the power monitor/control apparatus and the distributed power-source system.

FIG. 6 is an example of communications steps between the monitor/control apparatus 1 and the distributed power-source system 3. The monitor/control apparatus 1 monitors the power supply from the backbone power-transmission network 6 to the power-distributing/transforming substation 2, thereby judging whether or not an abnormality has occurred (S10).

If the abnormality is detected in the power supply, the permission-signal transmission unit 15 of the monitor/control apparatus 1 transmits the permission signal to the permission-signal reception unit 34 of the distributed power-source system 3 in accordance with a predetermined period (S11). Moreover, the permission-signal reception unit 34 transfers the permission signal, which is received from the permission-signal transmission unit 15 of the monitor/control apparatus 1, to the switch operation unit 32 (S12). Because of this transfer of the permission signal, the interruption command becomes invalid which is inputted from the single-operation detection unit 31 into the switch operation unit 32.

Incidentally, instead of transferring the permission signal received from the permission-signal transmission unit 15 to the switch operation unit 32, the permission-signal reception unit 34 may also generate a new permission signal thereby to transmit this new permission signal to the switch operation unit 32.

As described above, the interruption command becomes invalid which is inputted from the single-operation detection unit 31 into the switch operation unit 32. Accordingly, even if the single-operation detection unit 31 detects that the power supply from the power-distributing feeders 7 is stopped (S13), and transmits the interruption command to the switch operation unit 32 (S14), the switch 33 will not be opened.

Because of this situation, the power generated by the power-source apparatus 30 is supplied to the power-distributing feeders 7, which are separated from the electric-power system, via the power converter 35 and the switch 33. This power is supplied to the loads 4 and 5 which are connected to the power-distributing feeders 7. As a result, in a power-distributing feeder 7 whose independent operation is permitted, the power is supplied to the loads 4 and 5 connected thereto. This preferable situation makes it possible to maintain the life and safety in that local area, and to support early start of the reconstruction activity.

If, due to some cause or other, the permission signal from the permission-signal transmission unit 15 of the monitor/control apparatus 1 has been lost for a time-interval longer than a predetermined time-interval, the permission-signal reception unit 34 detects this communications interruption (i.e., permission-signal-reception-incapable state) (S15). Accordingly, the permission-signal reception unit 34 transmits a signal for indicating the non-permission of the independent operation (i.e., independent-operation non-permission signal) to the switch operation unit 32 (S16).

Here, the switch operation unit 32 has already received the interruption command from the single-operation detection unit 31 (S14). Consequently, when the switch operation unit 32 receives the independent-operation non-permission signal from the permission-signal reception unit 34, the unit 32 outputs the open signal (i.e., interruption signal) for opening the switch 33 (S17). Incidentally, a time-interval during which the interruption command from the single-operation detection unit 31 is valid is determined in advance. If the switch operation unit 32 has already received the interruption command within this valid time-interval, the unit 32 outputs the interruption signal to the switch 33 when the unit 32 receives the non-permission signal from the permission-signal reception unit 34.

In this way, in the preset embodiment, the permission-signal transmission unit 15 transmits the permission signal to the permission-signal reception unit 34 repeatedly in accordance with a predetermined short period. Furthermore, if the permission-signal reception unit 34 cannot receive the permission signal for a time-interval longer than a predetermined time-interval, the unit 34 judges that the independent operation becomes unpermitted. Accordingly, the permission-signal reception unit 34 transmits the non-permission signal to the switch operation unit 32. Consequently, the so-called fail-safe is implemented. This feature makes it possible to prevent a voltage from being generated in the power-distributing feeders 7, and to implement the safety of workers concerned.

In the preset embodiment configured in this way, if a wide-area and serious situation is caused to occur by, e.g., a natural disaster, it is possible to enhance a possibility of the power supply to an important load 5 by utilizing the distributed power-source system 3 effectively. In the preset embodiment, this feature makes it possible to maintain the activity in an important hub station, and to ensure such conditions as the safety in the local-area society.

Here, the explanation will be given below regarding the following case: Namely, as illustrated in FIG. 2, a failure PF occurs in the power supply from the backbone power-transmission network 6 to the power-distributing/transforming substation 2. As a result, the power supply from the power-distributing/transforming substation 2 to each of the power-distributing feeders 7 (1) and 7 (2) is stopped. In this case, the power from the distributed power-source systems 3 is supplied to the power-distributing feeder 7 (2) whose independent operation is permitted in advance. Accordingly, the important loads 5 can use this power.

The manager judges whether or not the power-generating amount of a distributed power-source system 3 and the power-consuming amount (i.e., power-demanding amount) of an important load 5 in a power-distributing feeder 7 are substantially balanced. Then, if the manager judges that these amounts are substantially balanced, the manager can permit the independent operation with respect to this power-distributing feeder 7. Incidentally, the judgment as to whether or not the power-generating amount of a distributed power-source system 3 and the power-consuming amount of an important load 5 on each power-distributing-feeder basis are substantially balanced can also be made automatically by using e.g., the computer system such as the management apparatus 8.

In the conventional technologies, if a power-distributing feeder 7 is separated from the electric-power system due to such causes as the occurrence of a natural disaster, the single operation of a distributed power-source system 3 is prohibited in order to ensure the safety of workers. Contrary to a technological idea like this, in the present embodiment, the single operation of the distributed power-source system 3 is permitted in order to effectively utilize the distributed power-source system 3 at the time of the occurrence of the natural disaster. Nevertheless, the distributed power-source system 3 whose independent operation is to be permitted (i.e., the power-distributing feeder 7 whose independent operation is to be permitted) is determined in advance. Accordingly, the workers can work in such a manner as to avoid the power-distributing feeder 7 in which the voltage is generated. Furthermore, in the present embodiment, if the permission signal from the monitor/control apparatus 1 is lost, the single operation of the distributed power-source system 3 is prohibited. Consequently, in the present embodiment, it is made possible at the time of the occurrence of the natural disaster to effectively utilize the distributed power-source system 3 while ensuring the safety of the workers.

Embodiment 2

Hereinafter, referring to FIG. 7 and FIG. 8, the explanation will be given below concerning a second embodiment of the present invention. The following respective embodiments including the present embodiment are equivalent to modified examples of the first embodiment. Accordingly, the explanation will be given in such a manner that basic attention is focused on the differences with the first embodiment. In the first embodiment, the description has been given regarding the case where the power-distributing feeder 7 whose independent operation is to be permitted is set in advance. In contrast thereto, in the present embodiment, with respect to the power-distributing feeder 7 whose independent operation has been permitted, a warning is issued to workers in the vicinity of the worksite.

In the present embodiment, each power-distributing feeder 7 is so designed as to start its single operation automatically, when each power-distributing feeder 7 is separated from the electric-power system. In more detail, if a failure occurs in the electric-power system, a monitor/control apparatus 1A transmits the permission signal to each distributed power-source system 3 repeatedly in accordance with a predetermined period. Consequently, each power-distributing feeder 7 performs its single operation in the state of being separated from the electric-power system. Incidentally, as is the case with the first embodiment, if the permission signal from the monitor/control apparatus 1A has been lost for a time-interval longer than a predetermined time-interval, the single operation is stopped immediately.

Figure 7:
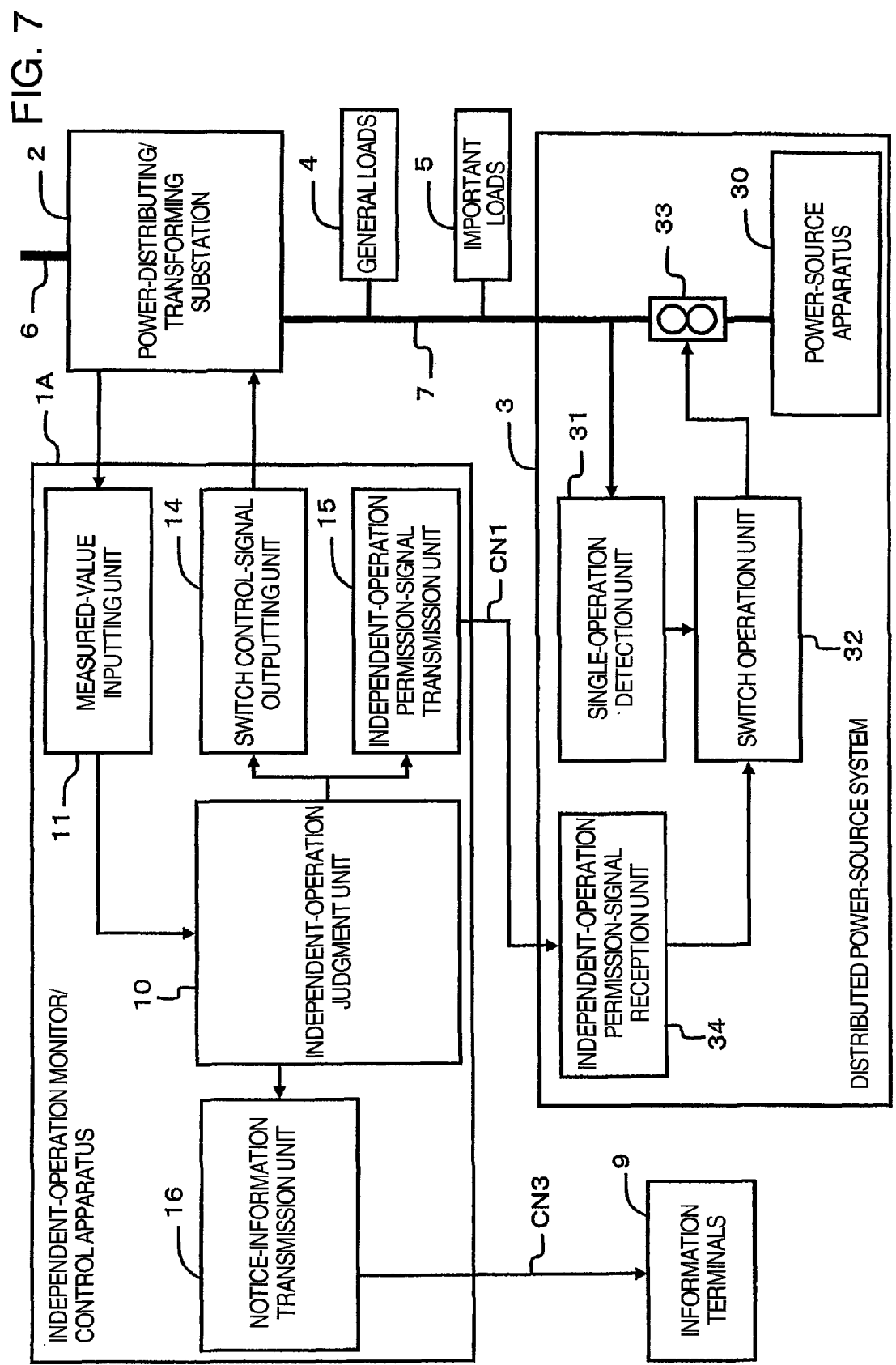
FIG. 7 illustrates the functional configuration of the power-distributing system including the power monitor/control apparatus according to a second embodiment.
Figure 8:
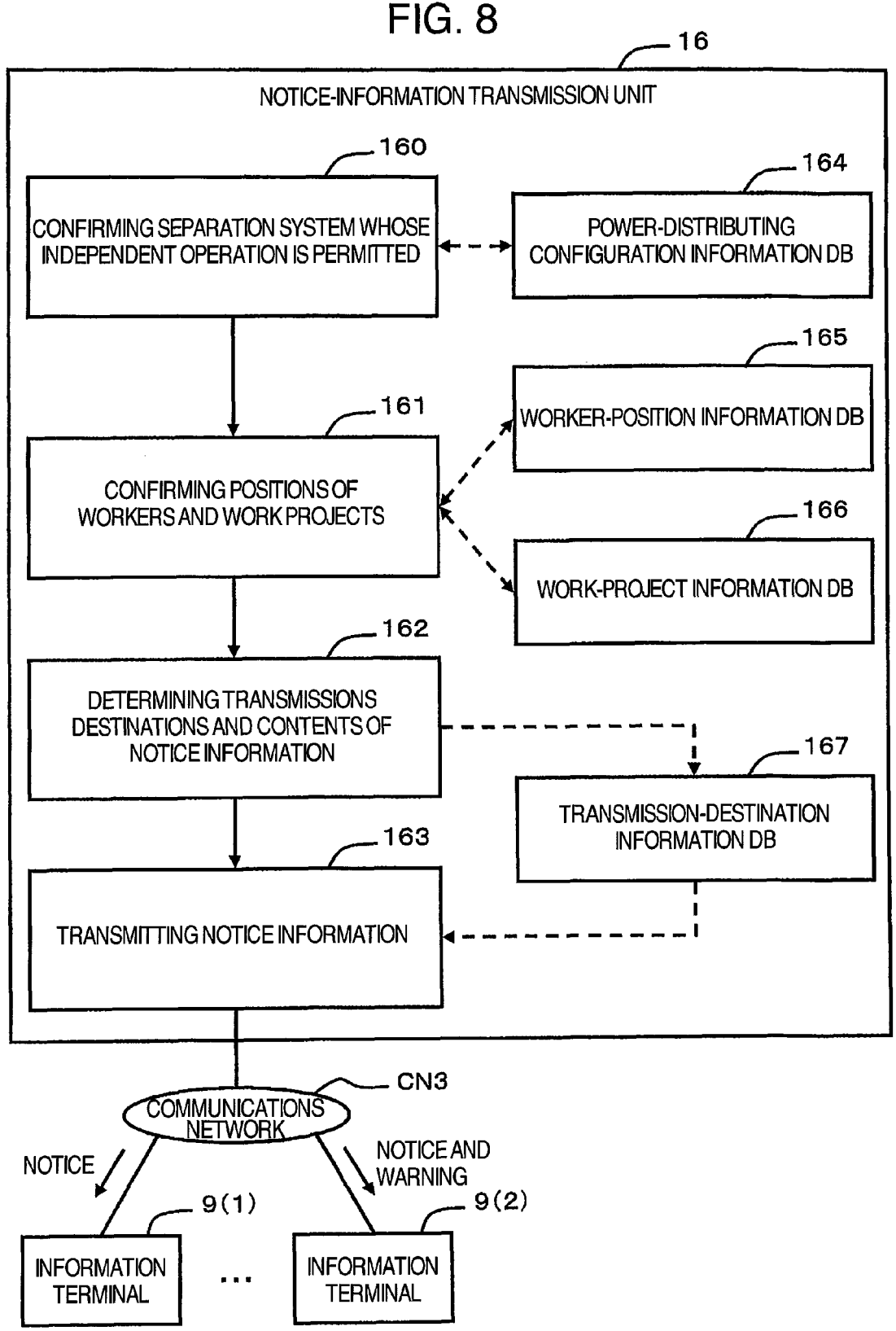
FIG. 8 illustrates the configuration of a notice-information transmission unit for transmitting information about the independent operation into the information terminal of a worker.

FIG. 7 is an example of a power-distributing system including the monitor/control apparatus 1A in the present embodiment. In comparison with the monitor/control apparatus 1 in the first embodiment, the monitor/control apparatus 1A includes none of the setting inputting unit 12 and the remote-command reception unit 13 which are equivalent to "setting unit". In the present embodiment, the power-distributing feeder 7 whose independent operation is to be permitted is not set in advance. Accordingly, the setting-unit-equivalent configuration is excluded.

Moreover, the monitor/control apparatus 1A in the present embodiment includes a notice-information transmission unit 16 in comparison with the monitor/control apparatus 1 in the first embodiment. The notice-information transmission unit 16 is connected to a plurality of information terminals 9 via a third communications network CN3. The third communications network CN3 may be configured as a communications network which is common to the first communications network CN1. The notice-information transmission unit 16 is of a function for transmitting predetermined notice information to the information terminals 9.

Hereinafter, referring to FIG. 8, the explanation will be given below regarding the functional configuration of the notice-information transmission unit 16. The notice-information transmission unit 16 includes, e.g., a plurality of processings 160 to 163 and a plurality of databases 164 to 167.

The first processing 160 is designed for confirming a separation system whose independent operation is permitted. From the independent-operation judgment unit 10, the first processing 160 receives the power-distributing-feeder identifier for identifying the separation system (i.e., power-distributing feeder 7) whose independent operation is permitted. Based on the power-distributing-feeder identifier and the power-distributing configuration information database 164, the first processing 160 identifies the power-distributing feeder 7 whose independent operation is permitted. In the power-distributing configuration information database 164, the configurations of the power-distributing system and the power-distributing-feeder identifiers are managed in such a manner that a one-to-one correspondence relationship is established therebetween.

The second processing 161 is designed for confirming the positions of workers and work projects. Based on the worker-position information database 165 and the work-project information database 166, the second processing 161 confirms the positions of the workers and the work projects. The worker-position information database 165 manages identifiers of the information terminals 9 possessed by the respective workers (or, identifiers of the respective workers) and the present positions of the information terminals 9 in such a manner that a one-to-one correspondence relationship is established therebetween. The present positions of the information terminals 9 can be measured using, e.g., GPS (:Global Positioning System). The work-project information database 166 manages the identifiers of the information terminals 9 possessed by the respective workers (or, identifiers of the respective workers) and the work projects in such a manner that a one-to-one correspondence relationship is established therebetween.

The third processing 162 is designed for determining transmissions destinations and contents of the notice information. The third processing 162 determines the range within which the notice information should be transmitted, and the contents of the notice information. The range within which the notice information should be transmitted refers to the information terminals 9 to which the notice information should be transmitted. The contents of the notice information refer to, e.g., the type of a message included in the notice information, and a notice method for the notice information.

For example, a regular message, such as "Independent operation is underway in ∘∘ district. Please work carefully.", is transmitted to an information terminal 9 which is distant from the power-distributing area of a power-distributing feeder 7 whose independent operation is underway. Also, an emergency message, such as "You are in danger. Please stop work temporarily, and ensure safety.", is transmitted to an information terminal 9 which is positioned within the power-distributing area of the power-distributing feeder 7 whose independent operation is underway. Simultaneously, a warning sound is caused to be blown in this information terminal 9. The transmission-destination information database 167 memorizes the transmission range and transmission contents of the notice information. The power-distributing area means a geographical area into which the power is supplied by the power-distributing feeder 7.

Incidentally, the configuration is also allowable where the notice information is not transmitted to the following information terminal 9: Namely, the information terminal 9 which is distant by a predetermined-or-more distance from the power-distributing area of the power-distributing feeder 7 whose independent operation is underway, and the information terminal 9 which is possessed by a worker who is not scheduled to work within the power-distributing area. This configuration makes it possible to reduce the communications amount at the time of the occurrence of a disaster.

The fourth processing 163 is designed for transmitting the notice information to the information terminals 9. The fourth processing 163 transmits the notice information to the information terminals 9 by making reference to the transmission-destination information database 167. In the example illustrated in FIG. 8, the regular message is transmitted to the information terminal 9 (1) which is distant by a predetermined-or-more distance from the power-distributing area of the power-distributing feeder 7 whose independent operation is underway. Also, the emergency message and the warning signal are transmitted to the information terminal 9 (2) which is closer to the power-distributing area of the power-distributing feeder 7 whose independent operation is underway. Having received the warning signal, the information terminal 9 (2) vibrates itself, blows a buzzer, or blinks a lamp, for example.

The present embodiment configured in this way also exerts basically the same effects as those of the first embodiment. Moreover, in the present embodiment, when each power-distributing feeder 7 is separated from the electric-power system, its independent operation is permitted in principle. In addition, in the present embodiment, the notice information indicating that the independent operation of each power-distributing feeder 7 is permitted is transmitted to the information terminals 9 possessed by the workers.

In the present embodiment, this feature makes it unnecessary to set in advance a power-distributing feeder 7 whose independent operation is to be permitted. As a result, it becomes possible to save an extra time and labor taken by the manager. Furthermore, in the present embodiment, it becomes possible to activate the larger number of distributed power-source systems 3, and to supply the power to the larger number of loads 4 and 5 while ensuring the safety of the workers.

Embodiment 3

Hereinafter, referring to FIG. 9 to FIG. 11, the explanation will be given below concerning a third embodiment of the present invention. In the present embodiment, the explanation will be given regarding the following case: Namely, a power-distributing feeder 7 whose independent operation is underway is reconnected to the electric-power system.

Figure 9:
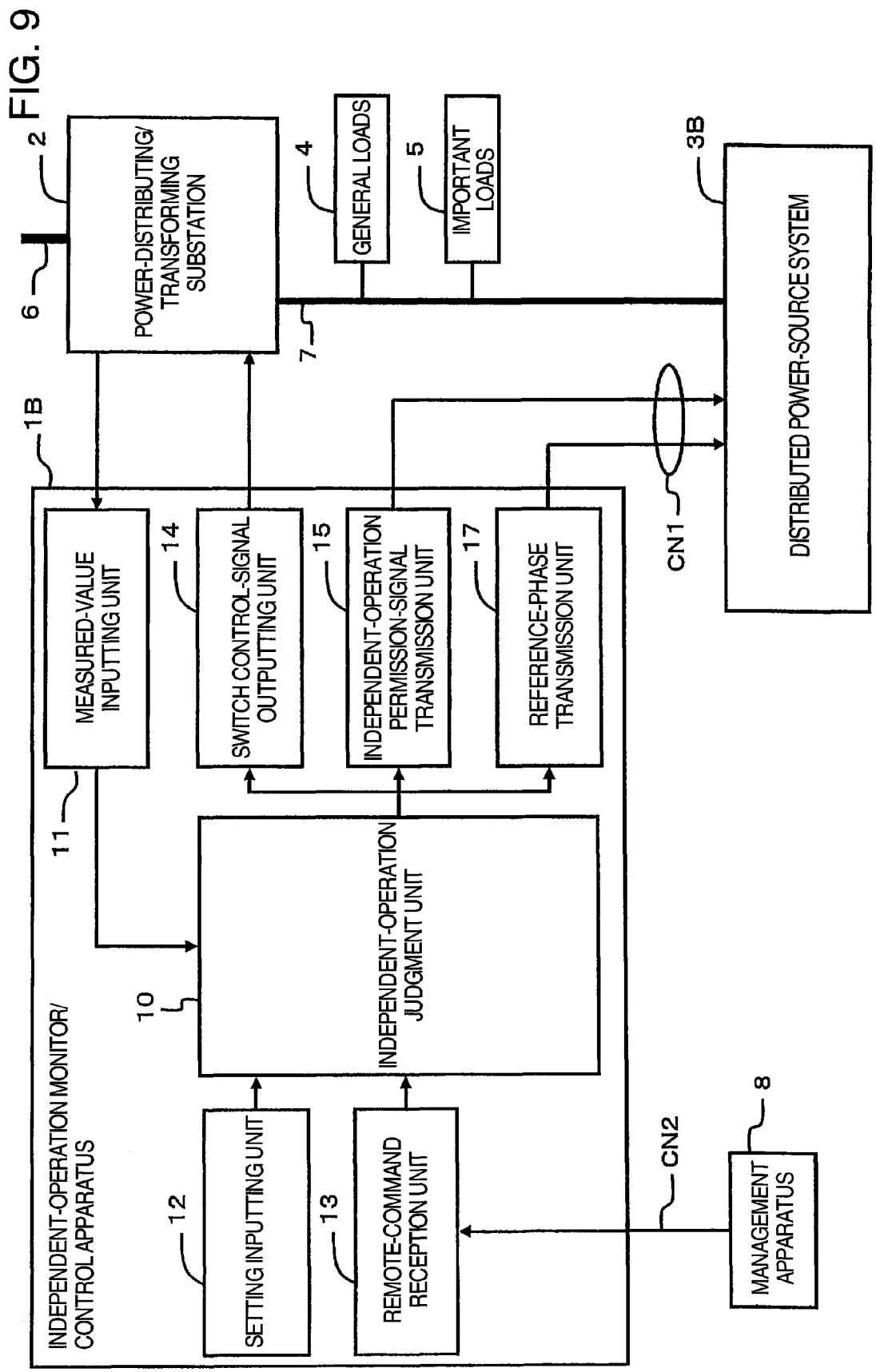
FIG. 9 illustrates the functional configuration of the power-distributing system including the power monitor/control apparatus according to a third embodiment.

FIG. 9 is the configuration diagram of a power-distributing system including a monitor/control apparatus 1B in the present embodiment. In comparison with the monitor/control apparatus 1 in the first embodiment, the monitor/control apparatus 1B further includes a reference-phase transmission unit 17.

The reference-phase transmission unit 17 is of a function for transmitting a reference phase on the main-system side to the distributed power-source system 3. The main-system side here indicates an upstream side (i.e., higher-voltage side) of the switch 22 when seen from the power-distributing feeders 7 which become the separation system. Concretely, the main-system side is the side of the bus line 20 which is illustrated in FIG. 3.

The phase of the main system (i.e., bus line 20) is referred to as "reference phase". The reference phase can be calculated from the voltage value which is acquired via the measured-value inputting unit 11. If a failure on the main-system side is recovered, and if the power supply from the backbone power-transmission network 6 to the power-distributing/transforming substation 2 is restored, the reference phase is calculated. Moreover, the reference phase calculated is transmitted to the distributed power-source system 3 via the first communications network CN1.

Figure 10:
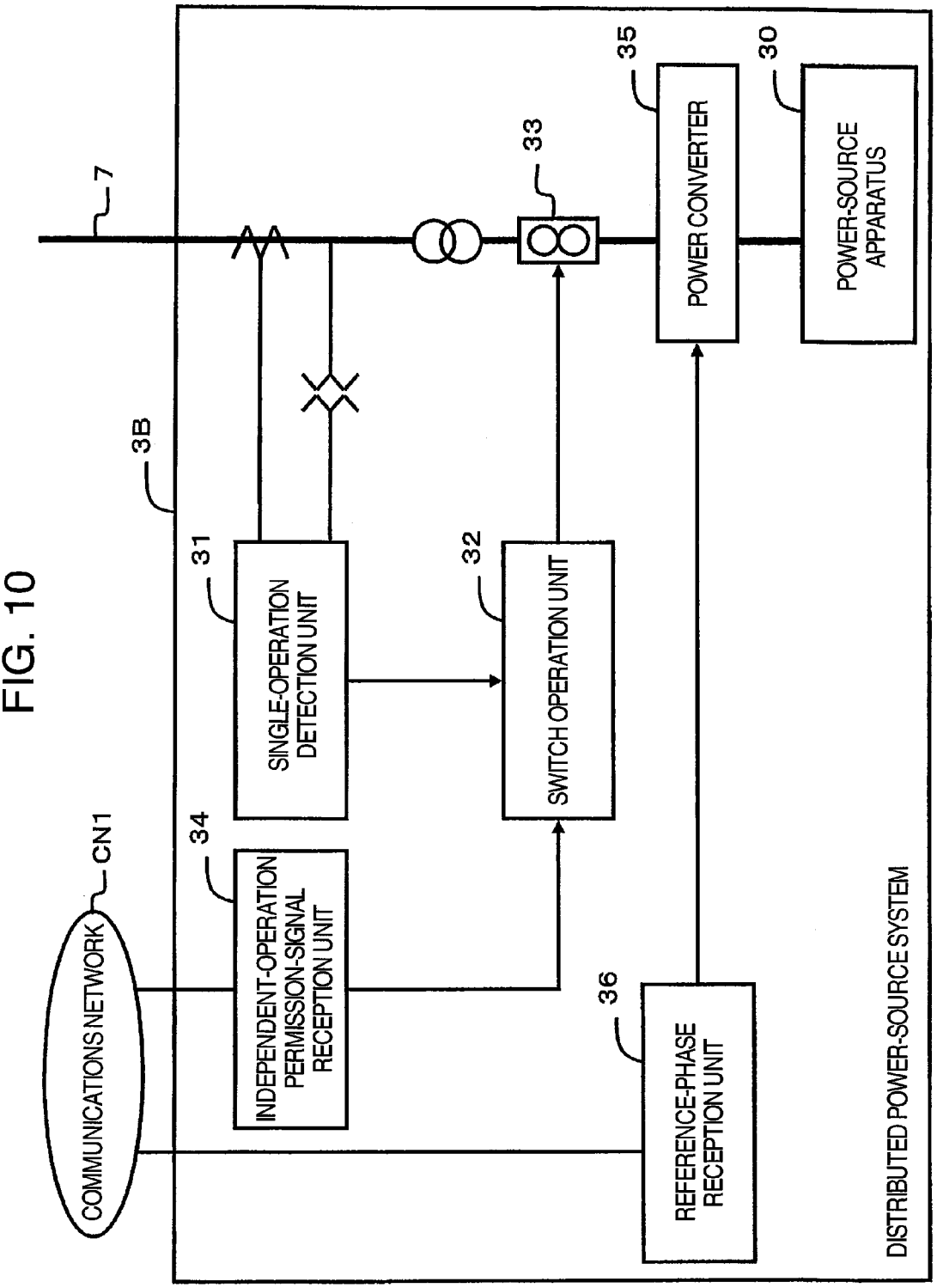
FIG. 10 illustrates the configuration of the distributed power-source system.

FIG. 10 is a configuration example of a distributed power-source system 3B in the present embodiment. In comparison with the distributed power-source system 3 in the first embodiment, the distributed power-source system 3B in the present embodiment further includes a reference-phase reception unit 36.

The reference-phase reception unit 36 receives the reference phase transmitted from the reference-phase transmission unit 17 of the monitor/control apparatus 1B. Moreover, the reference-phase reception unit 36 transmits the reference phase to the power converter 35, thereby instructing the power converter 35 to start a synchronous operation. When the power converter 35 starts the synchronous operation, the phase of the power outputted from the distributed power-source system 3B comes nearer to the reference phase gradually, then becoming equal to the reference phase after a while.

Figure 11:
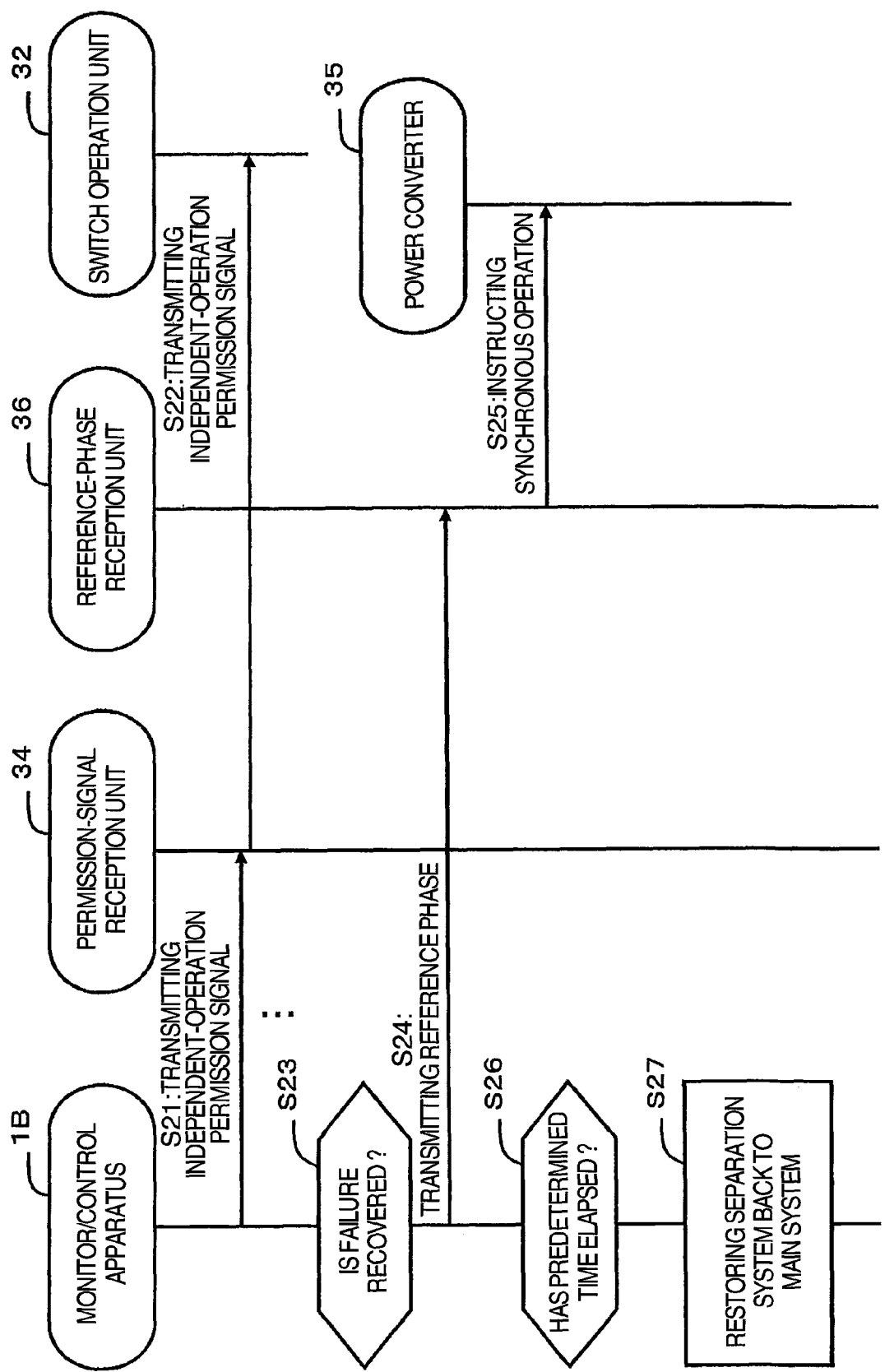
FIG. 11 is an explanatory diagram for illustrating a manner of how the communications processing is performed between the power monitor/control apparatus and the distributed power-source system.

FIG. 11 illustrates the operation in the present embodiment. The explanation will be given from the state where the independent operation of a certain power-distributing feeder 7 is permitted (S21, S22).

If the failure on the main-system side is recovered (S23), the monitor/control apparatus 1B calculates the reference phase. The reference-phase transmission unit 17 transmits the reference phase to the reference-phase reception unit 36 (S24). Furthermore, the reference-phase reception unit 36 informs the power converter 35 of the reference phase, thereby instructing the power converter 35 to perform the synchronous operation (S25).

The monitor/control apparatus 1B judges whether or not a predetermined time has elapsed since the point-in-time at which the monitor/control apparatus 1B transmitted the reference phase to the distributed power-source system 3B (S26). This predetermined time is determined in advance as a time which is long enough for the phase of the power supply from the distributed power-source system 3B to become equal to the reference phase. When the predetermined time has elapsed, the monitor/control apparatus 1B causes the switch 22 to be closed via the switch operation unit 25. This close operation reconnects the power-distributing feeder 7, i.e., the separation system, to the bus line 20, i.e., the main system (S27).

The present embodiment configured in this way also exerts basically the same effects as those of the first embodiment. Moreover, in the present embodiment, the power-distributing feeder 7 whose independent operation has been underway is restored back to the electric-power system. This feature makes it possible to revive the mutual coordination between the power-distributing feeder 7 and the electric-power system.

Incidentally, the present invention is not limited to the above-described embodiments. Those who are skilled in the art will find it possible to perform a variety of additions and modifications within the scope of the present invention. For example, the third embodiment can also be applied to the second embodiment.

Also, in the present embodiment, no specific limitation is made to the operation of the loads 4 and 5. For example, however, following configuration is also allowable: Namely, the power consumption of the general loads 4 connected to the power-distributing feeders 7, i.e., the separation system, is lowered by executing the so-called demand-response control. This configuration allows the power from the distributed power-source systems 3 to be supplied to the important loads 5 in larger amount.

Furthermore, the power-distributing feeder 7 has been mentioned as the unit of the system section which is to be separated from the electric-power system. For example, however, following configuration is also allowable: Namely, this separation from the electric-power system is made implementable in a system section which is larger or smaller than the power-distributing feeders 7.

Also, as will be described hereinafter, the present invention can also be grasped as the invention of a communications scheme between the power monitor/control apparatus and the distributed power-source system.

Expression 1.

A power-monitor/control-dedicated communications scheme for establishing the connection between a power monitor/control apparatus for monitoring and controlling an electric-power system, and a control apparatus for controlling a distributed power-source system, wherein the power monitor/control apparatus is so designed as to detect whether or not power supply from the electric-power system is stopped with respect to a predetermined system section, the predetermined system section being separated from the electric-power system by operating a predetermined switch, and transmit a permission signal if the power supply from the electric-power system to the predetermined system section is stopped, the permission signal being used for permitting the power supply to the predetermined system section, the power supply being performed by the distributed power-source system included within the predetermined system section, wherein the control apparatus for controlling the distributed power-source system is so designed as to stop the operation of a single-operation prevention unit if the control apparatus receives the permission signal from the power monitor/control apparatus, the single-operation prevention unit being used for prohibiting the power supply performed by the distributed power-source system to the predetermined system section, and is equipped with a transmission interface (15) for transmitting the permission signal from the power monitor/ control apparatus to the control apparatus for controlling the distributed power-source system, and a reception interface (34) for allowing the control apparatus to receive the permission signal from the power monitor/control apparatus.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A power monitor/control apparatus for monitoring and controlling an electric-power system, comprising:

an independent-operation judgment unit for detecting whether a power supply supplied from the electric-power system to a predetermined system section of a plurality of predetermined system sections of the electric-power system has stopped, and determining whether a permission signal should be transmitted to a distributed power-source system based on a presence or an absence of a flag stored in a memory that corresponds to said predetermined system section, said permission signal indicating that power supply from said distributed power-source system included within said predetermined system section is permitted to the predetermined system section of the electric-power system, and for sending a control signal to operate a switch that separates or connects said predetermined system section to said electric-power system; and a permission-signal transmission unit for transmitting said permission signal to said distributed power-source system, wherein said independent-operation judgment unit sends said permission signal to be transmitted from said permission-signal transmission unit to said distributed power-source system, if said independent-operation judgment unit determines that the permission signal should be transmitted after detecting a stop of said power supply to said predetermined system section from said electric-power system.

2. The power monitor/control apparatus according to claim 1, further comprising:

a setting unit for setting advisability/inadvisability-determining information into said independent-operation judgment unit, said advisability/inadvisability-determining information being used including said presence or absence of flag stored in the memory.

3. The power monitor/control apparatus according to claim 2, wherein said setting unit outputs a display screen and receives input that sets said advisability/inadvisability-determining information for each of said plurality of predetermined system sections.

4. The power monitor/control apparatus according to claim 1, wherein each of the plurality of predetermined system sections include one or more loads, wherein the presence or absence of the flag corresponding to each of the plurality of predetermined system sections is based on whether a predetermined system section includes a load that is given a relative high priority with respect to other loads.

* * * * *